United States Patent [19]
Langseth

[11] Patent Number: 4,519,084
[45] Date of Patent: May 21, 1985

[54] MATCHED FILTER FOR COMBATING MULTIPATH FADING

[75] Inventor: Rollin E. Langseth, Colts Neck, N.J.

[73] Assignee: AT&T Bell Laboratories, Murray Hill, N.J.

[21] Appl. No.: 426,816

[22] Filed: Sep. 29, 1982

[51] Int. Cl.³ .............................................. H04B 3/06
[52] U.S. Cl. ......................................... 375/14; 333/18; 364/724; 364/825; 375/103
[58] Field of Search .................... 375/96, 99, 101, 103, 375/15, 14; 455/296, 307, 65; 328/167; 364/724, 825; 333/18

[56] References Cited
U.S. PATENT DOCUMENTS
3,937,899 2/1976 Denenberg ...................... 179/84 VF
4,004,226 1/1977 Qureshi et al. ......................... 375/15
4,206,320 6/1980 Keasler et al. ..................... 375/96 X

OTHER PUBLICATIONS
Greenstein et al., "A Polynomial Model for Multipath Fading Channel Responses", Bell System Technical Journal, Sep. 1980, pp. 1197–1225.
Ungerboeck, "Adaptive Maximum-Likelihood Receiver for Carrier-Modulated Data-Transmission Systems", IEEE Trans. on Comm., vol. COM-22, No. 5, May 1974, pp. 624–636.

Primary Examiner—Robert L. Griffin
Assistant Examiner—Raymond C. Glenny
Attorney, Agent, or Firm—John Francis Moran

[57] ABSTRACT

A carrier and timing recovery technique is disclosed for combating the phase effects of multipath fading occurring during radio transmission. The technique is based on a known mathematical model of multipath fading. A test variable generator (26) develops a number of test variables whose relationship characterizes the multipath distortion. A processor (27) derives a plurality of coefficients of weighting measures from the test variables. The coefficients serve to adjust a matched filter (28) to provide greater use of those portions of the received radio signal yielding higher signal-to-noise ratios than those portions with lesser yields, as well as to compensate for multipath phase perturbations. The technique is also compatible with maximum-likelihood sequence detection techniques to provide further compensation for multipath fading effects.

10 Claims, 4 Drawing Figures

MATCHED FILTER FOR COMBATING MULTIPATH FADING

TECHNICAL FIELD

The present invention relates generally to radio communications. The invention more particularly relates to timing and carrier recovery techniques which minimize phase or timing errors such as those associated with multipath fading.

BACKGROUND OF THE INVENTION

It has been found that amplitude and delay distortion resulting from multipath fading can, under certain conditions, be a major cause of transmission deterioration in both digital and FM radio communications systems. Experimental and analytical evidence indicate the outages of wideband digital systems, caused by this phenomenon (i.e., selective fading), may exceed system performance objectives. Due to the frequency selectivity of the multipath fades, transmission error rates can exceed design objectives much more frequently than is predicted from consideration of fades solely resulting from a drop in total received signal power. This means that techniques for handling flat fades, such as AGC, will not be adequate to maintain satisfactory wideband digital transmission, and that additional correction will be required. Even the use of space diversity techniques and/or frequency-responsive equalization will not eliminate all of the problems associated with selective fading.

The problem, however, is that signal fading resulting from multipath transmission is basically unpredictable not only for when it occurs but also in the magnitude of the transmission deterioration experienced. Accordingly, compensation for carrier and timing recovery techniques must be capable of measuring transmission parameters independently of carrier signal phase. The measured parameters may then be used to implement a matched filter responsive to changing signal conditions. If such compensation techniques utilize analog correlation, it advantageously would not be restricted to a particular modulation format.

SUMMARY OF THE INVENTION

Measured transmission parameters are obtained for the complex transfer function of the multipath medium based on a prescribed mathematical model. The measured parameters are processed and the results adjust a filter to match it to the medium to provide carrier phase and clock recovery independent of multipath fading effects. When the filter is matched, it serves to maximize those portions of the transmitted signal which yield the greater signal-to-noise ratio to combat the phase effects of multipath distortion on the received signal.

In some of the more specific aspects of the invention, apparatus first characterizes the radio channel from the received signal to generate test variables. A processor receives the test variables and manipulates them to produce weighting coefficients. The weighting coefficients control the operation of a matched filter which minimizes the phase effects of multipath fading.

In some of the further aspects of the invention, the apparatus for characterizing uses various combinations of the signal components and their derivatives to develop the test variables. The derivatives are also applied to the matched filter. The weighting function of the matched filter selects portions of each signal component and both derivatives to produce each output signal component. The processing uses a simultaneous set of mathematical relationships wherein prescribed constants help to develop the weighting coefficients. In the illustrative embodiment of the invention, the signal components are two in number and are in quadrature phase relationship to one another.

DETAILED DESCRIPTION

Figure 1:
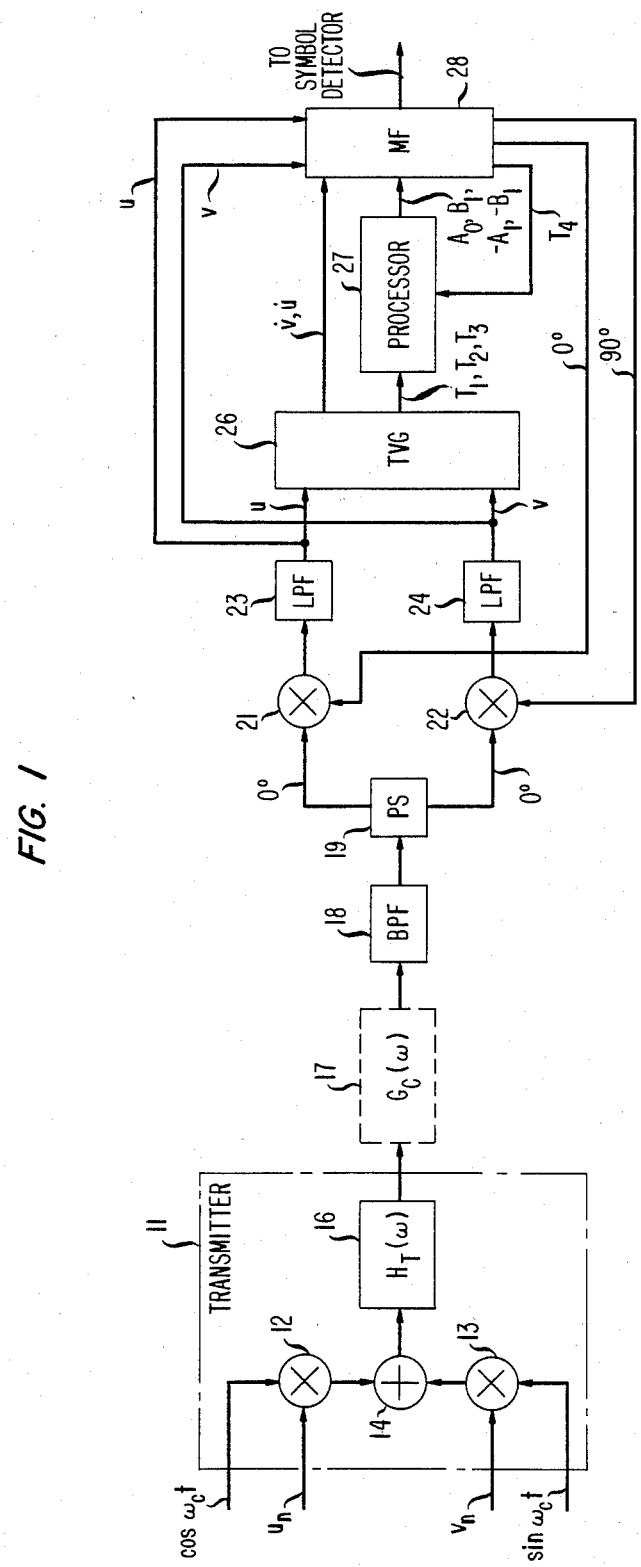
FIG. 1 is an overall arrangement including a transmitter and receiver coupled by an impaired transmission channel wherein the receiver utilizes the present inventive principles to reduce the phase effects of the transmission channel on the received signal.

FIG. 1 illustrates a basic model representing a portion of a typical radio transmission system subject to multipath fading. At the sending end, transmitter 11 accepts two independent signals (e.g., two non-return to zero (NRZ) data streams) which are each impressed on one of two quadrature phases of a carrier signal by modulators 12 and 13 and combined by coupler 14. Transmit filter 16 is of conventional design and serves to control spectral sidelobes of the transmission signal. While undergoing transmission, the signal is subjected to multipath distortion $G_C(\omega)$ symbolically illustrated by dotted line box 17 before being first filtered by received bandpass filter 18. The signal is then divided into two equal components by power splitter 19. The two components are then demodulated by multipliers 21 and 22. Each component is next applied to one of lowpass filters 23 and 24 to provide inputs for test variable generator 26. The output of test variable generator 26 is a plurality of multipath parameters which are manipulated by processor 27 to provide an output. The output serves to adjust the gain of amplifiers within matched filter 28 so that it indeed is matched. Matched filter 28 produces a baseband signal essentially free of the phase effects of the multipath distortion. The primary purpose therefore is to obtain estimates at the receiver end of the on-going multipath complex frequency response over the signal band to appropriately adjust matched filter 28.

A mathematical foundation will now be provided for the application of the inventive principles. The channel is accurately characterized by a straight-through path of strength $A_0$ ($A_0 \leq 1$), and a "distortion" term proportional to the derivative of the complex transmitted signal. The channel model utilized here corresponds to that described in an article entitled "A Polynomial Model for Multipath Fading Channel Responses", in the Bell System Technical Journal, September 1980, at pps. 1197–1225 by L. J. Greenstein and B. A. Czekaj. Thus, the Channel model is $$G_c(\omega) = A_0 + (A_1 + jB_1)j\omega \qquad (1)$$
$$= A_0 - B_1\omega + j\omega A_1.$$

The assumption is made that $A_0 > 0$ since any fixed phase factor of the form $e^{j\beta}$ multiplying $G_c$ will be removed by the carrier recovery circuitry. In Equation (1), $\omega$ is measured with respect to the center of the radio channel, and $A_1 + jB_1$ is the complex gain of the derivative distortion introduced by the channel. It should be noted that $A_1$ and $B_1$ are real quantities. Accordingly, the frequency response required in the matched filter 28 is just $$G_c^*(\omega) = A_0 - B_1\omega - j\omega A_1 = A_0 - j\omega(A_1 - jB_1). \quad (2)$$

Since the channel introduces derivative distortion, it is natural to provide differentiation in the test channel variable generator 26. Thus, let $y(t)$ denote the complex envelope (with respect to $\omega_c$, the center frequency of the radio channel) of the output of a filter matched to $H_T(\omega)$ which is the transfer function of filter 16. The following complex test variables are then defined $$T_1 = <|y|^2> \quad (3)$$

$$T_2 = <y'y^*> \quad (4)$$

and $$T_3 = <|y'|^2> \quad (5)$$

where the primes denote differentiation, and the brackets mean time averages (and, hence, can be thought of as including ensemble averaging over the random data contained in $y(t)$).

It is supposed that $s(t)$ denotes the signal that would be received at the output of filter 18 when matched to transmitter filter 16 in the absence of channel distortion, i.e., when $A_0 = 1$, $A_1 = B_1 = 0$. From Equation (1), it follows that in the presence of multipath distortion we have $$y(t) = A_0 s(t) + (A_1 + jB_1)s'(t) \quad (6)$$

and $$y'(t) = A_0 s'(t) + (A_1 + jB_1)s''(t) \quad (7)$$

Thus $$<|y|^2> = A_0^2 <|s|^2> + (A_1^2 + B_1^2)<|s'|^2> + 2\text{Re } A_0(A_1 - jB_1)<s(t)s'^*(t)> \quad (8)$$

$$<|y'|^2> = A_0^2 <|s'|^2> + (A_1^2 + B_1^2)<|s''|^2> + 2A_0 \text{Re}(A_1 + jB_1)<s''s'^*> \quad (9)$$

and $$<y'y^*> = A_0^2 <s^*s'> + (A_1 - jB_1)A_0 <|s'|^2> + A_0(A_1 + jB_1)<s^*s''> + (A_1^2 + B_1^2)>s''s'^*> \quad (10)$$

In Equations (8)–(10), the unknowns are the A's and B's, of course. The signal averages may be determined once and for all, as they depend only on the fixed transmitter filter (filter 16) and on certain data statistics, as will now be considered.

Let $d_k = u_k + jv_k$ represent the data symbol transmitted in the $k^{th}$ time slot, and let T = symbol period = (baud rate)$^{-1}$. Then we have $$s(t) = \sum_k d_k p(t - kT) \quad (11)$$

where $p(t)$ is the impulse response of the combination of the transmitter filter and its matched filters (filter 16 and 18) independently of the multipath channel distortion. Thus $$p(t) = \frac{1}{2\pi} \int_{-\infty}^{\infty} e^{j\omega t}|H_T(\omega)|^2 \left[\frac{\sin \omega T/2}{\omega T/2}\right]^2 d\omega. \quad (12)$$

(The sinx/x factor comes from the assumed rectangular shape of the quadrature modulations in the model of FIG. 1.)

Although it is not necessary, it is assumed that the transmitter filtering is symmetrical, in which case $p(t)$ is real. In this case, it may be demonstrated that a. $<ss'^*> = 0.$ (13)

b. $<s^*s''> = -<|s'|^2>.$ c. $<s''s'^*> = 0.$

Accordingly, we have the following test variables:

$$T_1 = <|y|^2> = A_0^2 <|s|^2> + (A_1^2 + B_1^2)<|s'|^2> \quad (14)$$

$$T_2 = <y'y^*> = -2jA_0 B_1 <|s'|^2> \quad (15)$$

and $$T_3 = <|y'|^2> = A_0^2 <|s'|^2> + (A_1^2 + B_1^2)<|s''|^2>, \quad (16)$$

with the following signal averages:

$$<|s^{(k)}|^2> = \frac{<|d|^2>}{T} \int_{-\infty}^{\infty} [p^{(k)}(t)]^2 dt \quad (17)$$

where $k = 0, 1, 2$ denotes the various orders of the derivatives appearing in Equations (14)–(16), and where $<|d|^2> = <|d_k|^2>$ (stationary data).

From equations (14) and (16) one readily determines the signal power, $A_0^2$, as well as $A_1^2 + B_1^2$, the power of the derivative distortion introduced by the channel.

Equation (15) then provides $B_1$, which is the imaginary (quadrature) portion of the derivative. Given $B_1$ and $A_1^2 + B_1^2$, $A_1^2$ follows immediately. In other words, the measurements implied by Equations (14)–(16) tell us everything about the multipath parameters, with the exception of the sign of $A_1$.

In order to determine the sign of $A_1$, let us suppose that the symbol detector is operating with a reasonable error rate. (Reasonable here means, roughly, small compared to 0.5.) Provided that the proposed multipath measurement scheme is satisfactorily tracking multipath variations, this assumption is reasonable. Let $\{\hat{d}_k\}$ denote the sequence of detector output symbols, and consider the remodulation scheme obtained by modulating $y'(t)$ with $\{\hat{d}_k\}$. This procedure yields $y_1(t)$, where $$y_1(t) = A_0 \sum_k \hat{d}_k d_k^* p'(t - kT) + (A_1 + jB_1) \sum_k d_k \hat{d}_k^* p''(t - kT). \quad (18)$$

Let us further assume that a reasonably accurately timed clock has been recovered from the matched filter output: the phase of such a clock is in fact correct and is independent of multipath parameters. If we use this clock to generate a pulse waveform by sampling $y_1(t)$ every T seconds, we obtain the signal $$y_2(t) = \sum_n y_1(nT)g(t - nT) \tag{19}$$

with g(t) a fixed pulse waveform, of duration less than T; e.g., it may be a rectangular pulse generated by a sample and hold procedure. Using Equation (18), $$y_2(t) = \sum_n g(t - nT) \sum_k [A_0 d_k \hat{d}_k^* p'((n - k)T) + \tag{20}$$

$$(A_1 + jB_1)d_k \hat{d}_k^* p''((n - k)T)].$$

In writing Equations (18)–(20), it has been tacitly assumed that a local oscillator of proper phase is available to yield exactly $y_1$ and $y_2$ as shown above. In fact, even though the carrier recovery circuit can deliver a local oscillator whose phase is independent of the multipath parameters, there still exists the possibility that this phase will not be zero. For example, both the times-4 and remodulator type carrier recovery circuits that may be used in quadrature phase shift keyed radio systems may lock at 0 degrees, ±90 degrees, or 180 degrees with respect to the phase of the received signal.

Thus, the complex envelope signal which will actually be available is $e^{j\phi}y_1(t)$ (see Equation (18)), where $\phi$ may have one of the four possible values enumerated above. The symbol detector operating on this signal would then deliver an output sequence $e^{j\phi}\{\hat{d}_k\}$, where the $\hat{d}_k$'s are "close" to the $d_k$'s. The remodulation scheme (18) would still yield the signal $y_1(t)$, however, since it uses the complex conjugate of the detector output data stream, $e^{-j\phi}\{\hat{d}_k^*\}$, which removes the fixed local oscillator phase, yielding expression (20) again.

Returning to Equation (20), if $P_e$ denotes the probability of symbol error, then it is easy to show that $<d_k \hat{d}_k^*> = <|d_k|^2> \times [1 - P_e + P_e\delta]$, where $\delta$ is a constant whose size is of the order of unity. For example, for four-$\phi$PSK, $\delta = -1$. It follows that, during each pulse period, the ensemble average amplitude of $y_2(t)$ is just the expression $$(1 - P_e + P_e\delta) \sum_k <|d_k|^2>[A_0 p'((n - k)T) + \tag{21}$$

$$(A_1 + jB_1)p''((h - k)T)]$$

the real part of which is obtained by omitting the $jB_1$ portion. Thus, if we time-average the real part of $y_2(t)$, we obtain $$\text{Re}<y_2>_t \cong \frac{<|d|^2>}{T} \int_{-\infty}^{\infty} g(t)dt \cdot \sum_k [A_0 p'(kT) + A_1 p''(kT)]. \tag{22}$$

By virtue of symmetry, the term in Equation (22) involving p' is zero. Also, by virtue of the Poisson Sum Formula, as presented in *The Fourier Integral and Its Applications* by A. Papoulis, McGraw-Hill Book Company, Inc. 1962, at page 48, $$\sum_k p''(kT) = -\frac{1}{T} \sum_k \left[\frac{k2\pi}{T}\right]^2 H\left[\frac{k2\pi}{T}\right] \tag{23}$$

where $$H(\omega) = \left[\frac{\sin\omega T/2}{\omega T/2}\right]^2 |H_T(\omega)|^2$$

(cf.(11)) so that the coefficient of $A_1$ in Equation (22) is negative. Thus, by observing merely the sign of Equation (22), the sign of $A_1$ is determined.

Now that a mathematical analysis has been provided, the reader is instructed to return to FIG. 2 which illustrates the circuitry of test variable generator 26 of FIG. 1. The two signal inputs u(t) and v(t) are the real and imaginary signal components whose derivatives are obtained by respective differentiators 31 and 32. Also in the circuit are square law circuits 36–39 for producing squared values of their signal inputs. As may be observed from FIG. 2 various combinations of the signal values are used to generate test variables $T_1$, $T_2$ and $T_3$. For $T_1$, the output of square law circuits 36 and 37 are summed by adder 41 and then lowpass filtered by filter 42. For $T_2$, the inputs to adder 43 are the product outputs from multipliers 44 and 46. For the latter multiplier, inverting amplifier 47 effectively multiplies the output of differentiator 31 by minus one. To provide a time averaged or mean value, filter 48 operates on the output of adder 43. Finally, the outputs of square law circuits 38 and 39 are combined in adder 49 whose output sum is averaged by filter 51 to produce $T_3$.

Figure 3:
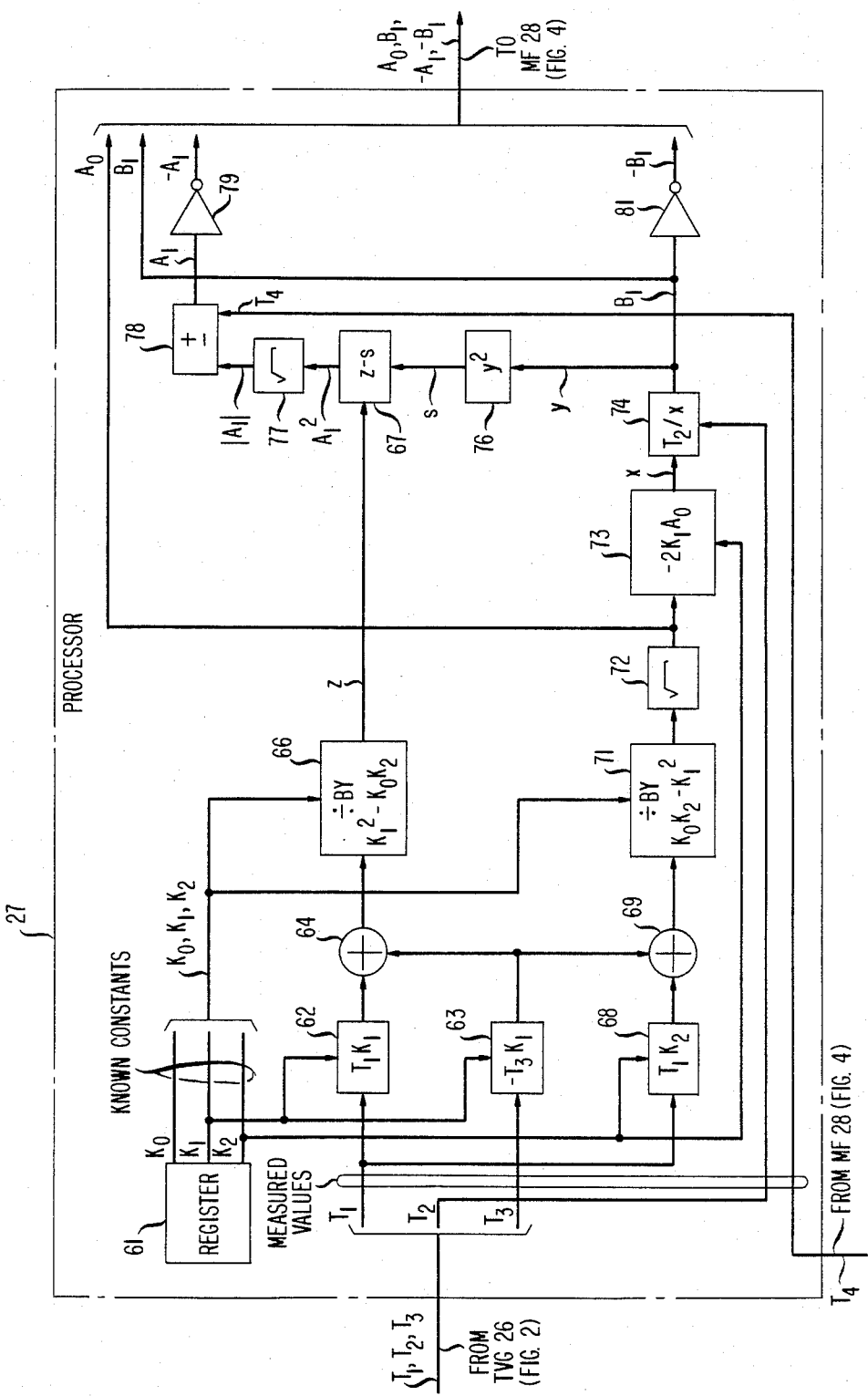
FIG. 3 depicts the internal circuitry deployed in the processor of FIG. 1.
Figure 4:
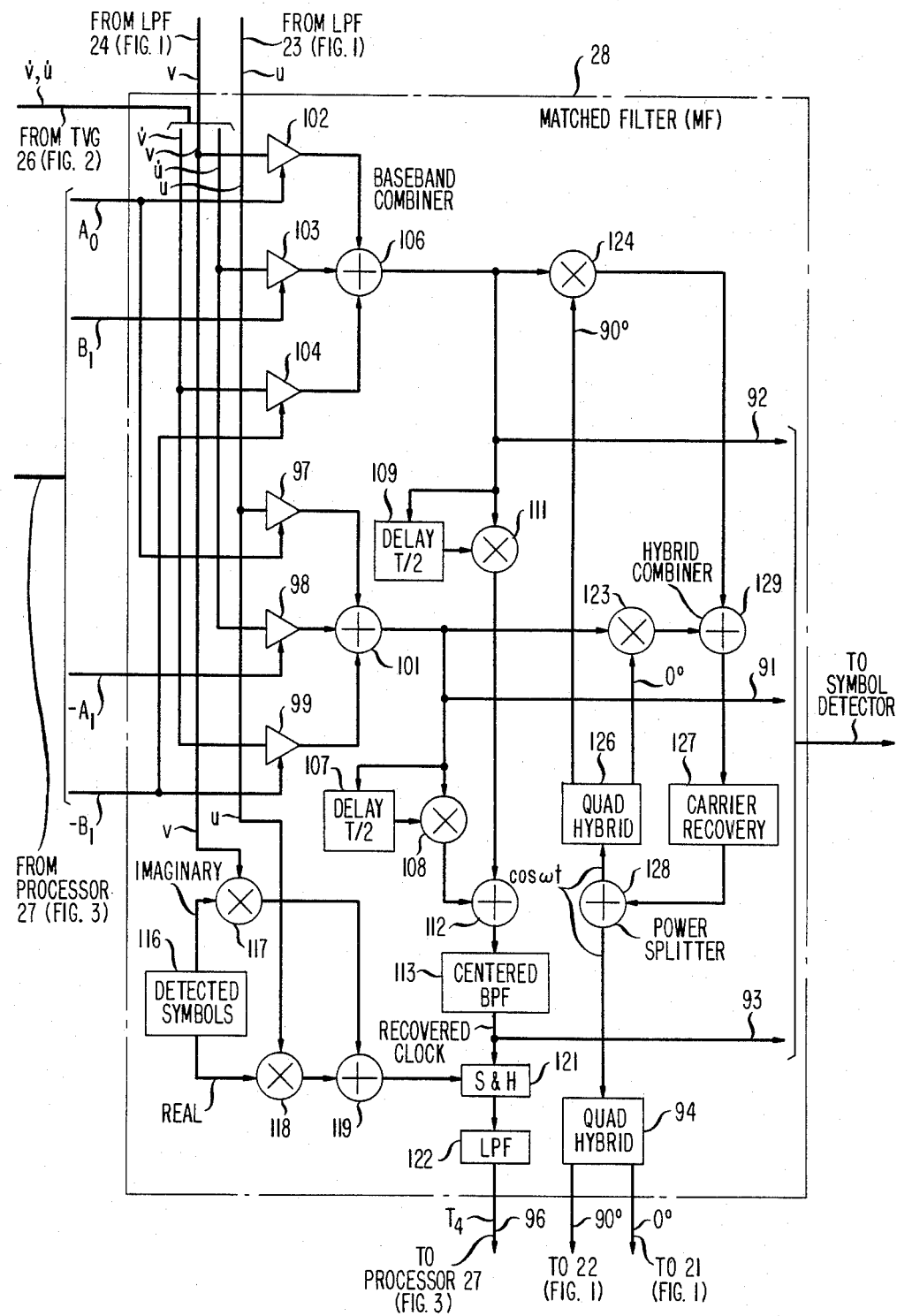
FIG. 4 provides the circuit arrangement of the matched filter in accordance with the present inventive principles which also provides the output signal for the arrangement of FIG. 1.

FIG. 3 shows the operations performed on the test variables indicative of the multipath fading occurring during transmission to generate a series of coefficient outputs for the appropriate operation of matched filter 28 illustrated in detail in FIG. 4. In addition to the test variables, register 61 provides three known constants associated with the pulse shaped functions of filters 16 and 18 in FIG. 1. These constants may be thought of as spectral moments of their respective signal components. Equivalently, these constants represent various orders of derivatives appearing in equation (17). The processing involved is mathematically described by solving simultaneous equations (14)–(16). The solutions may be written as $$A_0 = \sqrt{\frac{T_1 K_2 - T_3 K_1}{K_0 K_2 - K_1^2}} \quad (A_0 \text{ assumed positive}) \tag{24}$$

$$B_1 = \frac{T_2}{-2K_1 A_0} \tag{25}$$

$$A_1 = \sqrt{\frac{T_1 K_1 - T_3 K_1}{K_1^2 - K_0 K_2}} - B_1^2 \tag{26}$$

Although a number of individual components are shown in FIG. 3, such processing may be conveniently performed by programming a suitable microprocessor. Accordingly, the microprocessor would perform the indicated multiplications, subtractions and divisions using the known constants and the measured test variables. For real time operation, this process should be updated every few thousand baud times, for example every thirty thousand baud times for a thirty Megabit radio system to provide thirty thousand baud-time averaging. Thus, calculations are performed every millisecond which is compatible with the operation of a variety of commercially available microprocessors.

Equations (24)–(26) were obtained by first using the three constants in place of the average values of s and its derivatives in Equations (14)–(16) and then solving for the coefficients. In FIG. 3, $A_1$ is obtained by solving Equation (26). This initially involves performing the operations in multipliers 62 and 63, adder 64, divider 66 to provide a first input for subtractor 67. The other input to subtractor 67 is provided by the operations of multiplier 68, adder 69, divider 71, square rooter 72, multiplier 73, divider 74 and squarer 76. The numerical output of subtractor 67 is then applied to square rooter 77 and sign selector 78. Finally, inverting amplifier 79 provides an output signal indicative of the coefficient $-A_1$. In the processing to get $A_1$, the output of square rooter 72 produces the coefficient $A_0$ while divider 74 produces $B_1$ and inverting amplifier 81 produces $-B_1$.

FIG. 4 accepts the calculated coefficient values from processor 27, the real and imaginary signal components from the output of filters 23 and 24, and their derivatives from test variable generator 26 to provide the matched filter function to compensate for the timing and phase jitter variations produced by multipath fading.

Matched filter 28 produces real and imaginary signal outputs respectively on conductors 91 and 92 for a conventional symbol detector (not shown) and also a recovered clock signal on output 93. Quadrature hybrid 94 provides two outputs from the carrier recovery operation performed in filter 28 for multipliers 21 and 22 of FIG. 1 which provide the demodulation. The final output of filter 28 is test variable $T_4$ on output 96 which is related to the recovered clock signal.

In filter 28, the real signal component on output 91 is produced by the operation of variable gain amplifiers 97, 98 and 99, which each provide a product input to adder 101. Similarly, the imaginary signal component at output 92 is produced by the operation of variable gain amplifiers 102, 103 and 104 which each provide an input to adder 106 which produces the signal on output 92. From the real and imaginary signal components on outputs 91 and 92, delay 107 and multiplier 108 and also delay 109 and multiplier 111 each provide an input for adder 112 whose output is bandpass filtered by filter 113 to produce the recovered clock signal on output 93. This particular type of clock recovery circuit implemented in FIG. 4 is one of a number of suitable conventional techniques. This technique as well as some other techniques are described in Chapter 14 of *Digital Communications by Satellite* by j. J. Spilker, Jr., published by Prentice-Hall, Inc., 1977.

The remaining circuitry in filter 28 that is associated with the $T_4$ variable in output 96 includes symbol detector 116 whose quadrature related signals are applied to multipliers 117 and 118. The other inputs to multipliers 117 and 118 are the imaginary and real signal components from lowpass filters 23 and 24 of FIG. 1. The outputs from multipliers 117 and 118 are combined in adder 119 which together with the recovered clock signal operates sample and hold circuit 121. The output of sample and hold circuit 121 is then lowpass filtered by filter 122 to produce a test variable $T_4$.

Finally, multipliers 123 and 124 are each connected to receive the output signals on outputs 91 and 92. The other inputs to multipliers 123 and 124 are produced by the quadrature related output of quadrature hybrid 126. The input to quadrature hybrid 126 is provided by carrier recovery circuit 127 via power splitter 128. Carrier recovery circuit 127 is driven by the output of hybrid combiner 129 which receives the outputs of each of multipliers 123 and 124. This completes the carrier recovery operation from which the output of quadrature hybrid 94 is generated. For additional background and various suitable conventional carrier recovery techniques for implementation in box 127, the previously cited text by J. J. Spilker, Jr. may be consulted at chapter 10 and, more particularly, at chapter 12.

Figure 2:
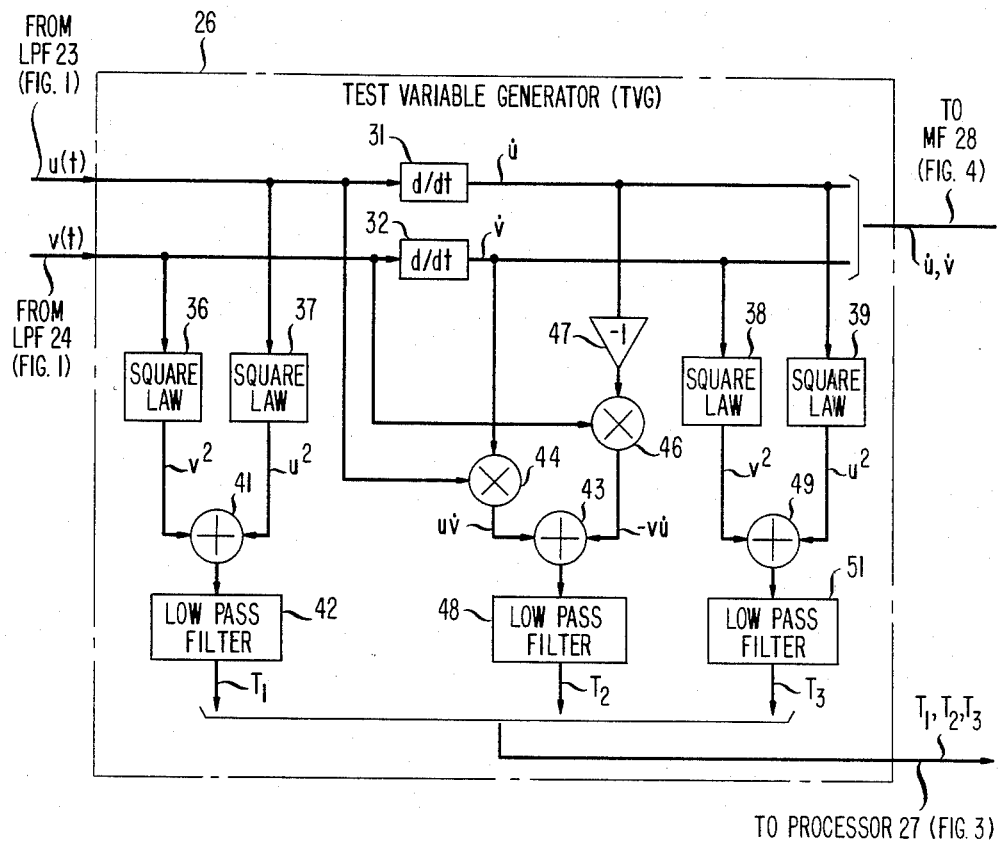
FIG. 2 is a block diagram illustrating the details of the test variable generator of FIG. 1.

The matched filter of FIG. 4 is a time domain implementation of the frequency domain expression of equation (2). The operation of the circuit of FIG. 4 in conjunction with the circuits of FIGS. 2 and 3 will be described. In FIG. 2, a number of test variables are developed using relationships between the real and imaginary signals, the real and imaginary signals and their derivatives, and between the derivatives only. The relationships between these developed variables and sign information provides information on the effects of multipath fading encountered by received signal during transmission. The circuit of FIG. 3 processes these test variables to develop weighting coefficients for controlling the operation of the circuit of FIG. 4. In FIG. 4, the effect of these weighting coefficients serves to compensate for the phase characteristics of the radio channel and to maximize the signal energy in the frequency band of the channel at frequency points or ranges where the signal to noise ratio is the highest.

The inventive principles have been utilized in an illustrative embodiment of the invention wherein the phase effects of multipath distortion are combated by a matched filter implemented for baseband signals, i.e., mixers 21 and 22 serve as demodulators to provide the real and imaginary signal components which are phase compensated by the circuit of FIG. 4. Of course, the inventive principles may also be utilized in an implementation which operates directly on the carrier signals, i.e., a passband application. Moreover, the illustrative embodiment of the invention utilizes analog correlation techniques and so is not restricted to a particular modulation format. Also the inventive principles may be applied wherein other than symbol by symbol detection is employed, for example, sequence detection such as maximum-likelihood decoding to correct for intersymbol interference in addition to phase and timing effects produced by multipath distortion. In such a case, the measured parameters may be used both to implement the matched filter and to directly compute the intersymbol interference generated by a multipath channel. In addition to maximum likelihood detection, such parameters may be utilized in the employment of decision feedback reception techniques.

I claim:
1. Apparatus for combating phase error introduced by a transmission path on a received signal, the apparatus using a prescribed power series mathematical model of the transmission path to reduce the effect of phase error, the apparatus comprising:
    characterizing means for generating an output of test variables using components of the received signal and a derivative of each component;
    processing means for mathematically manipulating the test variables in accordance with relationships expressing the power series mathematical model to produce weighting coefficients for operating on the received signal; and
    filtering means, connected to receive the weighting coefficients and the signal components, for using those portions of the frequency spectrum of the received signal having the greater signal-to-noise ratio to a greater extent than the remaining portions having lesser signal-to-noise ratios for producing a recovered clock signal and data outputs with reduced phase error.

2. Apparatus according to claim 1 wherein said characterizing means produces a second output of two derivatives, each from a signal component in the received signal.

3. Apparatus according to claim 2 wherein said filtering means is connected to receive the second output from the characterizing means and the derivatives are weighted in a manner similar to that used on the signal components.

4. Apparatus according to claim 3 wherein the processing means receives the test variables and processes them according to a simultaneous set of mathematical relationships to produce the weighting coefficients.

5. Apparatus according to claim 4 wherein the processing means comprises a register for retaining a set of prescribed constants, the prescribed constants being utilized by the processing means to generate the weighting coefficients.

6. Apparatus according to claim 5 wherein the filtering means comprises means for combining selected portions of each signal component and the two derivatives to produce each output signal component.

7. Apparatus according to claim 6 wherein the signal components are in quadrature phase relationship.

8. Apparatus according to claim 7 wherein the filtering means includes clock recovery means coupled to receive the two output signal components and the clock recovery means produces an output suitable for symbol detection on the output signal components.

9. Apparatus according to claim 8 wherein the filtering means further includes carrier recovery means coupled to receive the two output signal components, the carrier recovery means producing two outputs in quadrature phase relationship for demodulating the received signal before application to said characterizing means.

10. A receiver responsive to a carrier radio signal $y(t)e^{j\omega_c t}$ transmitted from a source using in-phase and quadrature phase modulation and subject to degradation by selective fading producing a received signal, the receiver capable of coherently demodulating the received signal to provide baseband signals u and v which are functions of the complex envelope signal $y(t) \cong u(t) + jv(t)$, the receiver comprising:

means for generating a plurality of test variables $T_1$, $T_2$ and $T_3$ from u and v and their respective derivatives $\dot{u}$ and $\dot{v}$ wherein each test variable is a distinct prescribed derivation of the received signal;

means for processing the test variables, $T_1$, $T_2$ and $T_3$, by simultaneously solving the equations $$T_1 = <|y|^2> = A_0^2 <|s|^2> + (A_1^2 + B_1^2) <|s'|^2>$$

$$T_2 = <y'y^*> = -2jA_0 B_1 <|s'|^2>$$

and $$T_3 = <|y'|^2> = A_0^2 <|s'|^2> + (A_1^2 + B_1^2) <|s''|^2>,$$

for the unknown channel impairment parameters of $A_0$, $-A_1$, and $+B_1$, respectively indicative of strength of the received signal, and the strengths of the in-phase and quadrature components of the time-derivatives of the received signal wherein predetermined constants of $<|s|^2>$, $<|s'|^2>$, and $<|s''|^2>$ are respectively defined as the time averages of the original waveform of the transmitted signal, its first time derivative, and its second time derivative; and matched filtering means including demodulating means for receiving the values of $A_0$, $-A_1$, $B_1$ and $-B_1$ and the carrier signals u and v and their derivatives u and v as signal component inputs, the matched filering means selecting portions of each signal component in accordance with selected ones of the weighting factors to produce baseband signals substantially free of the phase effects of selective fading.

* * * * *